(12) United States Patent
Sullivan et al.

(10) Patent No.: US 6,667,986 B1
(45) Date of Patent: Dec. 23, 2003

(54) SYSTEM AND METHOD FOR PROVIDING HIGH-SPEED DATA ACCESS USING A DISTRIBUTED MODEM

(75) Inventors: John M. Sullivan, Lisle, IL (US); Christopher J. Rozman, Kildeer, IL (US)

(73) Assignee: UTStarcom Incorporated, Alameda, CA (US)

(*) Notice: Subject to any disclaimer, the term of this patent is extended or adjusted under 35 U.S.C. 154(b) by 0 days.

(21) Appl. No.: 09/164,879

(22) Filed: Oct. 1, 1998

(51) Int. Cl.[7] .............................................. H04M 11/00
(52) U.S. Cl. ....................................... 370/420; 370/421
(58) Field of Search ................................. 370/420, 421, 370/419, 431; 375/222; 379/88.07, 93.01

(56) References Cited

U.S. PATENT DOCUMENTS

| | | | |
|---|---|---|---|
| 4,569,062 A | | 2/1986 | Dellande et al. |
| 4,922,484 A | * | 5/1990 | Yoshida et al. |
| 4,943,980 A | | 7/1990 | Dobson et al. |
| 4,953,210 A | | 8/1990 | McGlynn et al. |
| 5,267,263 A | | 11/1993 | Feezel et al. |
| 5,629,931 A | * | 5/1997 | Kausel ....................... 370/241 |
| 5,668,857 A | | 9/1997 | McHale |
| 5,781,617 A | | 7/1998 | McHale et al. |
| 5,831,561 A | * | 11/1998 | Cai et al. ..................... 341/106 |
| 5,852,655 A | | 12/1998 | McHale et al. |
| 5,898,761 A | | 4/1999 | McHale et al. |
| 5,905,781 A | | 5/1999 | McHale et al. |
| 6,072,825 A | * | 6/2000 | Betts et al. .................. 375/222 |
| 6,108,350 A | * | 8/2000 | Araujo et al. ............... 370/467 |
| 6,522,688 B1 | * | 2/2003 | Dowling ...................... 375/222 |
| 6,553,518 B1 | * | 4/2003 | Wave et al. ................. 714/704 |

OTHER PUBLICATIONS

Harry Newton, "Newton's Telecom Dictionary", 9th Edition, 1995.*

(List continued on next page.)

*Primary Examiner*—Kenneth Vanderpuye
(74) *Attorney, Agent, or Firm*—McDonnell Boehnen Hulbert & Berghoff

(57) ABSTRACT

A system and method for communicating data between a user connected to a subscriber line and a data network comprising a first module connected to the subscriber line and a second module, physically separate from the first module, connected to the data network. The first module includes a signal converter for converting analog signals received from the subscriber line to a digital signal for sending over an interconnection path to the second module. The second module includes a modulator/demodulator for converting the digital signal to data packets. The first module may be pooled with M first modules and connected over a shared interconnection path to N second modules. The interconnection path may be concentrated to permit communication of signals from those first and second modules communicating user data at any given time.

66 Claims, 5 Drawing Sheets

OTHER PUBLICATIONS

Application Ser. No. 09/056,166 to Mueller, et al. filed Apr. 6, 1998 entitled "Idle Mode for Digital Subscriber Line".

Application Ser. No. 09/343,150 to Kaufman et al. filed Jun. 29, 1999 entitled "Distributed Voice–Band Modem Pool with Front–End Idle Mode Processing".

Application Ser. No. 09/342,888 to LeVieux et al. filed Jun. 29, 1999 entitled "Distributed XDSL Modem Pool with Front–End Idle Mode Processing".

Application Ser. No. 09/343,147 to Barghouti et al. filed Jun. 29, 1999 entitled "Distributed Speech Coder Pool System with Front–End Idle Mode Processing for Voice–Over–IP Communications".

"General Introduction to Copper Access Technologies" retrieved from the World Wide Web at http://www.netspeed.com/tutorial.hmtl, printed on Oct. 7, 1998.

Kieran Taylor and Telechoice, "New Dial–Up ADSL Dodges DSL Deployment Obstacles" retrieved from the World Wide Web at http://www.netspeed.com/offhook.html, printed on Oct. 7, 1998.

Diagram entitled "End–to–End ATM Service Architecture" retrieved from the World Wide Web at http://www.netspeed.com/endtoendarch.html, printed on Oct. 7, 1998.

"Questions and Answers" retrieved from the World Wide Web at http://www.netspeed.com/qanda.html, printed on Oct. 7, 1998.

"xDSL Overview" retrieved from the World Wide Web at http://www.netspeed.com/overview.html, printed on Oct. 7, 1998.

* cited by examiner

SYSTEM AND METHOD FOR PROVIDING HIGH-SPEED DATA ACCESS USING A DISTRIBUTED MODEM

FIELD OF THE INVENTION

The present invention relates to the field of data communications, and more particularly to the field of data communications using connections over a telephone network.

BACKGROUND OF THE INVENTION

Due to the growing popularity of the Internet, modems have become standard components in personal computers. Users initiate data connections over the public switched telephone network by dialing up to Internet service providers. The Internet service providers typically have a bank or pool of modems that respond to the connections initiated by users and connect the users to the data networks that make up the Internet. Once connected, the users have access to a wide variety of services that may communicate information using graphics, sound, animation, and other multimedia features.

The accessibility of the Internet contributed to its success. The accessibility of the Internet may be attributed to the reach of the public switched telephone network. The public switched telephone network has evolved and become so extensive that telephone service is considered a basic utility. Because most people have a telephone network connection, most people can connect to the Internet by using a modem. Other ways to communicate with the Internet are available. As discussed below, however, many require additional equipment in the user's premises and in the telephony infrastructure. Connections through the telephone network require nothing more than a modem.

Modems are communications systems that convert telephony signals to data signals. Modems are systems that have an analog front end that communicates analog signals over the public switched telephone system and a digital back end that communicates data with a data system. The analog front end includes an analog-to-digital converter that converts the analog telephony signals to digital form. The front end sends the digital signals to the back end for processing as data. The back end converts the data to digital signals to send to the front end. The back end may also include high-level functions such as data compression, error detection and correction and other modem functions. The analog-to-digital converter converts the digital signals it receives from the back end to analog signals and sends the signals over the public switched telephone network.

Modems typically operate in environments in which space is a premium, such as in personal computers, or in laptop computers, or in a bank or pool of modems. Modem designers therefore attempt to keep the physical size of modems to a minimum. In addition, the bandwidth requirement for the connection between the front half and the back half of modems is typically high. Due to over-sampling by the analog to digital converter, the connection is designed to carry signals at several times the data rate of the modem. For example, the connection of a 56 k bits/sec modem may carry 3 times the 56 k bits/sec, or 168 k bits/sec. To meet physical space and bandwidth constraints, the front half and back half of modems are built to operate in the same module, which may be the same circuit board, or even the same piece of silicon.

Each data connection is a telephone connection that uses two modems: the user's modem and the Internet service provider's modem.

The user's modem is connected via a subscriber line to a local switch. The switch may connect the call via inter-office trunking, and optionally, via one or more intermediate switches, to another switch local to the Internet service provider. The switch then uses a subscriber line to connect to the service provider equipment, which includes the second modem in the connection. Data connections typically involve subscriber loops between the user and the local switch and between the service provider and the same or another local switch. The bandwidth of the subscriber loop connections is limited to the 64 kbits/sec bandwidth of the telephone lines. The data rate of the modems that connect to the telephone network analog lines is limited to the 64 kbits/sec available on the telephone lines.

It would be desirable to connect to the Internet or other data network at data rates that are faster than the 64 kbits/sec limitation of the telephony infrastructure.

Several systems have been developed to overcome the 64 kbits/sec bandwidth limitation. Digital subscriber lines (DSL) and the Integrated Digital Services Network (ISDN) provide connections with substantially higher data rates than 64 kbits/sec while off-loading data traffic from the telephone network. These solutions, however, require special equipment at the customer's premises and at the central office in which the switch that services the customer's service area is located. For example, DSL requires that a pre-switch adjunct be located in close proximity to the local switch to divert data traffic away from the interoffice trunks. The pre-switch adjunct is added in front of the switch (or before the switching functions are used) to connect a subscriber line directly to a data network through a remote access server, or other piece of equipment.

One desirable solution may be to install the second modems of data connections in remote digital terminals, or in other equipment that presently exists in locations that are between the customer and the switch. Remote digital terminals and other intermediate telephony equipment typically has higher data rate (e.g. DS1, DS3, OC1, OC3, OC9, etc.) connections. Because the equipment is closer to the customer than the switch, it may be feasible to connect high-speed data lines from the customer's modem to the modems in the intermediate telephony equipment. The special data equipment would then connect the data lines to the DS1 or DS3 lines.

One problem with this solution is that the modems in the intermediate equipment to which the high-speed data lines are connected have technical requirements that may not be adequately met by the telephony infrastructure. The digital processing components in the modems require operating conditions that may not exist in the intermediate equipment structures. The heat dissipation, power and space requirements of the modems used for high-speed data access tend to be different from the traditional telephony signals communicated by the telephony equipment. Much of the telephony equipment is installed in environments that may be too harsh for the modems. The present telephone infrastructure makes it difficult to allocate data communications resources where it would provide high-speed data access.

In view of the foregoing, it would be desirable to provide high-speed data access that is not limited to the bandwidth set by the telephone infrastructure.

It would be further desirable to provide high-speed data access without requiring data equipment to operate in the harsh environments that were intended only for telephony equipment.

It would be further desirable to off-load data traffic from the telephone network without requiring the insertion of new equipment at the local digital switch.

SUMMARY OF THE INVENTION

In view of the above, the present invention is directed to a communications system for communicating data between a data system and a user connected to a subscriber line. The system includes a first module communicably connected to the subscriber line to receive a first analog signal. The first module also sends a second analog signal back over the subscriber line. The first module includes a first digital connection for sending a first digital signal and for receiving a second digital signal. A signal converter converts the first analog signal to the first digital signal and the second digital signal to the second analog signal.

The system includes a second module, physically separate from the first module and communicably connected to the data system. The second module includes a second digital connection for receiving the first digital signal and for sending the second digital signal. A signal processor processes the first digital signal received from the second digital connection as a first data stream. The second module sends the data stream to the data system and processes a second data stream received from the data system as the second digital signal. The second module sends the second digital signal to the second digital connection. An interconnection path connects the first module to the second module. The interconnection path communicates the first and second digital signals between the first digital signal connection and the second digital connection.

In another aspect of the present invention, a method is provided for communicating data between a user at a subscriber line and a data network. In a first module, an analog signal at the subscriber line is converted to a digital signal. The digital signal is analyzed to determine if it includes user data. If the digital signal includes user data, the digital signal is communicated to a second module over an interconnection path between the first module and the second module. The second module is physically separate from the first module. In the second module, the digital signal is demodulated to yield a data signal, which is communicated the data signal to a data network.

In a further aspect of the present invention, a communications system is provided for communicating data between at least one data system and a plurality of users. The system includes M first modules, each communicably connected to a user via a subscriber line. Each first module includes a signal converter for converting a first analog signal received from the subscriber line to a first digital signal and for converting a second digital signal to a second analog signal for sending over the subscriber line. A first digital connection is connected to the signal converter for sending the first digital signal and for receiving the second digital signal.

The system further includes N second modules, physically separate from the M first modules, where N is less than or equal to M. The N second modules are communicably connected to at least one data system. Each second module has a second digital connection for receiving the first digital signal and for sending the second digital signal. A signal processor is included for processing the first digital signal received from the second digital connection as a first data stream for sending to the data system and for processing a second data stream received from the data system as the second digital signal for sending to the second digital connection. An interconnection path connects the M first modules to the N second modules. The interconnection path communicates the first and second digital signals between the first digital signal connection of the first modules and the second digital connection of the second modules.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION

Distributed Modems

Figure 1:
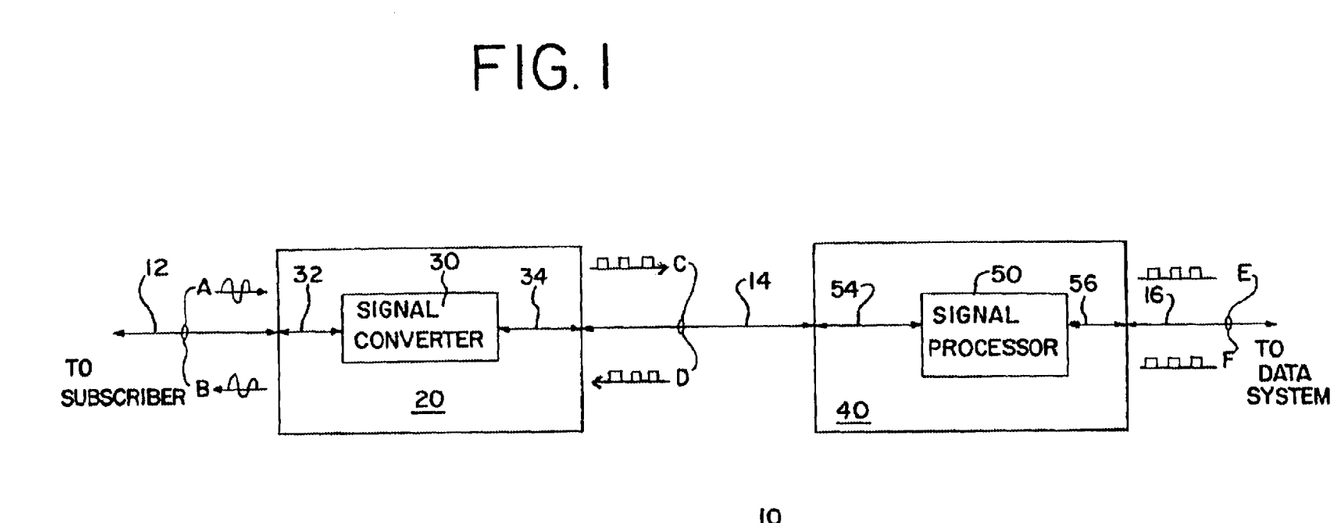
FIG. 1 is a block diagram of a distributed modem.

Referring to FIG. 1, a distributed modem 10 includes a first module 20 and a second module 40 having an interconnection path 14. The distributed modem 10 is "distributed" because the first module 20 is physically separate from the second module 40. For example, the first module 20 and the second module 40 may be on separate circuit boards, or on entirely separate chassis. The modules 20 may be separated from the second modules 40 by distances that may be measured in fractions of an inch, or in miles.

The first module 20 is connected to a subscriber line 12. The first module 20 includes a signal converter 30, an analog path 32 and a digital path 34. The signal converter 30 receives an analog signal A at the analog path 32. The signal converter 30 converts the analog signal A to a digital signal C that is output via the digital path 34 to the interconnection path 14 and received at the second module 40.

The signal converter 30 receives a digital signal D from the interconnection path 14 at the digital path 34. The signal converter 30 converts the digital signal D to an analog signal B and outputs it over the analog path 32 to the subscriber line 12. The analog signal B is carried to the user over the subscriber line 12, which is preferably of the type that is typically used by a user to communicate with the public switched telephone network (PSTN).

The analog path 32 may include components for processing the analog signal communicated over subscriber line 12 and for initiating and tearing down calls. These functions, which are known to those of ordinary skill in the art, may include without limitation the functions of detecting a ring, pulse dialing, tone dialing, providing overload/overvoltage protection, providing loop supervision, providing a hybrid, line testing and off-hook relay.

The analog path 32 may also include an idle pattern generator to send a signal that mimics an idle pattern. In one embodiment of the present invention, the first module 20 communicates digital signals to the second module 40 only when user data is detected from the subscriber line 12. User data includes any signal that may be demodulated to yield signals that convey information. If the subscriber line 12 is not carrying user data, it demodulates to an idle pattern. If an idle pattern is sensed, the first digital signal is not sent to the second module 40. The idle pattern generator is advantageously used to avoid the interruption of a connection when the subscriber line is idle. The digital path 34 may include functions for conditioning the digital signals C and D.

The signal converter 30 may include any coder/decoder (CODEC) that is known to one of ordinary skill in the art. For example, the signal converter 30 may include the coder/decoder that uses the pulse code modulation (PCM) techniques according to the G.711 standard. The signal converter 30 may include a digital signal processor (DSP) for performing signal processing functions that may be required in the signal conversion.

The interconnection path 14 communicates digital signals C and D between the first module 20 and the second module 40. The digital signals C and D comprise CODEC samples of analog data sampled by the signal converter 30. The second module 40 includes a signal processor 50 for converting the digital signal C to a first data stream E and for converting a second data stream F to a second digital signal D. The signal processor 50 receives the digital signal C from the interconnection path 14 at a second digital path 54. The signal processor 50 receives the data stream F from a data system at a data path 56 and sends the data stream E over the data path 56. The data path 56 includes an interface to a data system medium 16.

The first digital path 34 and the second digital path 54 may include a communication interface that would permit a user to achieve a high-speed link (>64 k bits/sec). Such an interface may be independent of the present telephony infrastructure and may simply provide the higher bandwidth. Alternatively, the interface may operate within the present telephony infrastructure by communicating using multiple user channels (described below with reference to FIG. 5).

The signal processor 50 may include a processing element to modulate/demodulate the data to/from the first module 20 and to perform high level functions such as, for example, data compression and error detection and correction. The signal processor 50 may include a single processing element for performing both the modulating/demodulating functions and the high level functions. The single processing element may include a digital signal processor (DSP) or a general purpose processor. Alternatively, more than one processor may be used in the signal processor 50. A digital signal processor may be used to perform the signal processing functions, such as the modulating/demodulating of the data to/from the first module 20. A separate general purpose processor such as a microprocessor may be used to perform the high level functions.

The second module 40 may include other components along the second digital path 54 and the data path 56 for enhancing the functionality of the second module 40. For example, the data path 56 may include a serial controller, a bus interface, or any other data system interface for connecting to the data system communications medium 16. The signal processor 50 may also include an idle sample generator to generate samples while the interconnection path 14 is idle. In one embodiment, the first module 20 does not transmit digital signals, or CODEC samples to the second module 40 when the subscriber line 12 is idle. The idle sample generator may generate idle samples to avoid the interruption of a connection with the data network when data is not being received from the first module 20. The data system communications medium 16 may include without limitation a simple serial interface (e.g. RS-232), or a packet switched network (e.g. Ethernet).

The distributed modem 10 may perform the functions of any modem available today. One advantage of the distributed modem 10 is that the first module 20 and the second module 40 are physically separated and connected by the interconnection path 14. The advantage of separating the modules is that the first and second modules 20, 40 may now be installed in locations having more suitable environments for the type of processing they perform.

For example, the first module 20 may be installed in a location that is close to the user, such as a remote digital terminal, a telephone network hut, a telephone network cabinet, etc. Such an installation may be made with a connection between the user's premises equipment and the first module 20. The digital signal processing performed by the second module 40 may be located in equipment that is placed in the central office serving the user's service area. The second module 40 need not be subjected to the harsh environment found in a remote digital terminal. The first module 20 may then be connected to the second module 40 using existing high-speed digital signal lines, such as fiber-optic lines communicating at levels of OC-3, OC-9, etc.

One difficulty arises in using the distributed modem 10 is that the interconnection path 14 is a wide-band connection that is no longer communicating over the short distances found in a circuit board or a silicon device. The interconnection path 14 physically separates the first module 20 and the second module 40 and still has the capacity to communicate signals at several times the data rate of the distributed modem 10. For example, the data rate of the distributed modem 10 may be a number S bits per second (e.g. 28.8 kbits/sec, 56 kbits/sec). The signal converter 30 mayt perform the necessary over-sampling to accurately convert the analog signal A to the digital signal C. The interconnection path 14 is therefore designed to have a bandwidth of several times S, for example, 3×S.

An advantage of using the distributed modem 10 is that the analog signal of the first module 20 may be connected to a high-speed subscriber line 12. The interconnection path 14 may include a new high-speed data line having a high bandwidth. Using the distributed modem 10 the user may then connect to the Internet using a high-speed subscriber line 12 that is not limited by the 64 kbits/sec limitation of the telephony infrastructure.

In another use of the distributed modem 10, the first module 20 may be implemented in a first circuit board which may be used as a line card in a line rack located the central office. The user's subscriber line 12 may be connected directly to the first module 20 in the central office, again bypassing the 64 kbits/sec limitation of the telephony infrastructure.

Figure 2A:
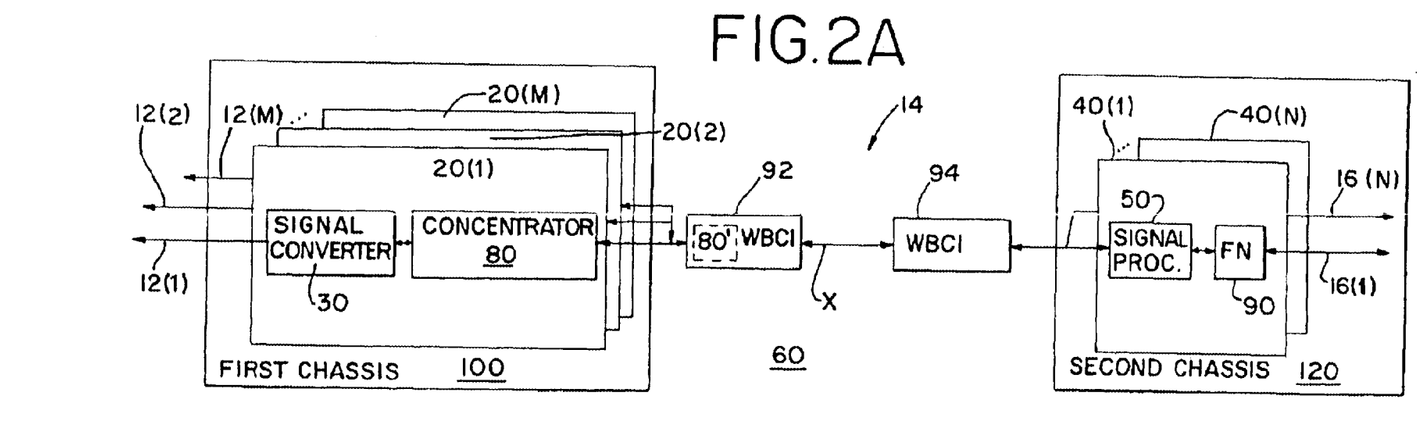
FIG. 2A is a block diagram of a distributed modem pool that uses the distributed modem of FIG. 1.

Referring to FIG. 2A, the distributed modem 10 may be extended to operate in modem banks or modem pools, or other equipment that performs the functions of modems for a plurality of subscriber lines. FIG. 2 shows a block diagram of a distributed modem pool 60. The distributed modem pool 60 in FIG. 2 includes a first chassis 100 and a second chassis 120 connected by an interconnection path 14. The first chassis 100 includes M first modules 20(1)–20(M), each of the first modules 20(1) et seq. being connected to a subscriber line 12(1)–12(M).

The first modules 20(1) et seq. may each include a signal converter 30, and a concentrator 80. The second modules 40(1)–40(N) may each include the signal processor 50 and a high-level function processor 90. The signal processor 50 performs the modulation/demodulation functions of the digital signals received from the first modules 20(1) et seq. and on the data stream received from the data communications medium 16(1) et seq. The high-level function processor 90 may perform a variety of high level functions. These functions may include data compression, error detection and correction, AT command processing, other modem command processing, communications statistics functions, and any other communications function requiring processing that may be found on a modem.

The first modules 20(1) et seq. are connected to the interconnection path 14 via a wide-band CODEC interface (WBCI) 92. The second chassis 120 includes N second modules 40(1)–40(N), each of the second modules 40(1) et seq. being connected to a data system connection 16(1)–16(N). The second chassis 120 is connected to the interconnection path 14 via a second wide-band CODEC interface 94.

The first and second chassis 100, 120 may include any type of enclosure that may be used to house one or more circuit boards or other type modules. The first and second chassis 100, 120 may include equipment for performing other functions such as telephony functions and data communications functions. The first chassis 100 may include for example line racks that are presently used in remote digital terminals and in central office switching systems. The second chassis 120 may include remote access servers, gateways or other equipment for performing data communications.

The interconnection path 14 and the wide-band CODEC interfaces 92, 94 may include any digital communications medium with sufficient bandwidths to carry the digital signals between the M first modules 20(1)-20(M) and the second modules 40(1)–40(N).

The concentrator 80 in each of the first modules 20(1) et seq. detects when a user that is connected at the respective subscriber line 12 is actively communicating data. The concentrator 80 enables the communication of data to and from the second modules when such data is detected. When the user is not actively communicating data, the concentrator 80 does not communicate signals to the second modules 40(1) et seq.

In one embodiment, the concentrator 80 analyzes the CODEC samples output from the signal converter 30 to determine if the samples represent data or if the signals result from idle analog signals. The concentrator 80 may analyze the CODEC samples by performing a partial demodulation function to determine if the subscriber line 12 is carrying signals that demodulate to signals that convey information. The concentrator 80 passes the CODEC samples that represent such data to the concentrated interconnection path 14 when the CODEC samples represent user data. The concentrator 80 passes the CODEC samples as data packets.

The concentrator 80 may include a digital signal processing device to analyze the digital signals for the presence or absence of user data. The DSP used in the concentrator 80 may be a lower performance and lower cost DSP than DSPs used in the second modules 40(1) et seq. because concentration does not require the same processing capabilities as full modulation and demodulation.

One advantage of using the concentrator 80 is that, when combined with the wide-band CODEC interface 92, the interconnection path 14 carries only data between the first and second modules 20, 40. The bandwidth of the interconnection path 14 need only accommodate the first and second digital signals that carry data, and not signals that are communicated during idle periods. In an alternative embodiment, a concentrator 80' is used in the first wide-band CODEC interface 92 instead of in the first module 20.

The first and second wide-band CODEC interfaces 92, 94 may be used to manage the communication over the interconnection path 14. In one embodiment, the concentrator 80 in the first module 20(1) et seq. creates data packets of CODEC samples which may be organized into channels by the first wide-band CODEC interface 92. The channels are communicated as a signal X over the interconnection path 14. The signal X may also communicate channels of data packets created by the signal processor 50 in the second modules 40(1) et seq. which may be placed in the channels at the second wide-band CODEC interface 94. The signal X in FIG. 2A is preferably communicated using a time division multiplex scheme, however, any other data communications scheme, which supports packet data may be adopted.

One advantage of communicating the CODEC samples as packets is that, at any instant in time, a packet containing CODEC samples for a particular user's data traffic could be handled by any one of several second modules 40(1) et seq. The signal processors 50 in each of the second modules 40(1) et seq. acquires sufficient historical information about the string of packets from which the samples belong. A given signal processor 50 may then process CODEC sample packets of user data from any of the first modules 20(1) et seq. in potentially a combination of upstream and downstream packets. This makes it unnecessary to establish a one-to-one correspondence between the first and second modules 20(1) et seq, 40(1) et seq.

In an alternative embodiment, the first module 20(1) et seq. communicates bursts of bit strings to and from a designated one of the second modules 40(1) et seq. The first and second wide-band CODEC interfaces 92, 94 may include module addressing schemes for designating target modules for any given burst of bit string. In other embodiments, the data may be communicated in packets to a designated second module 40(1) et seq.

Figure 2B:
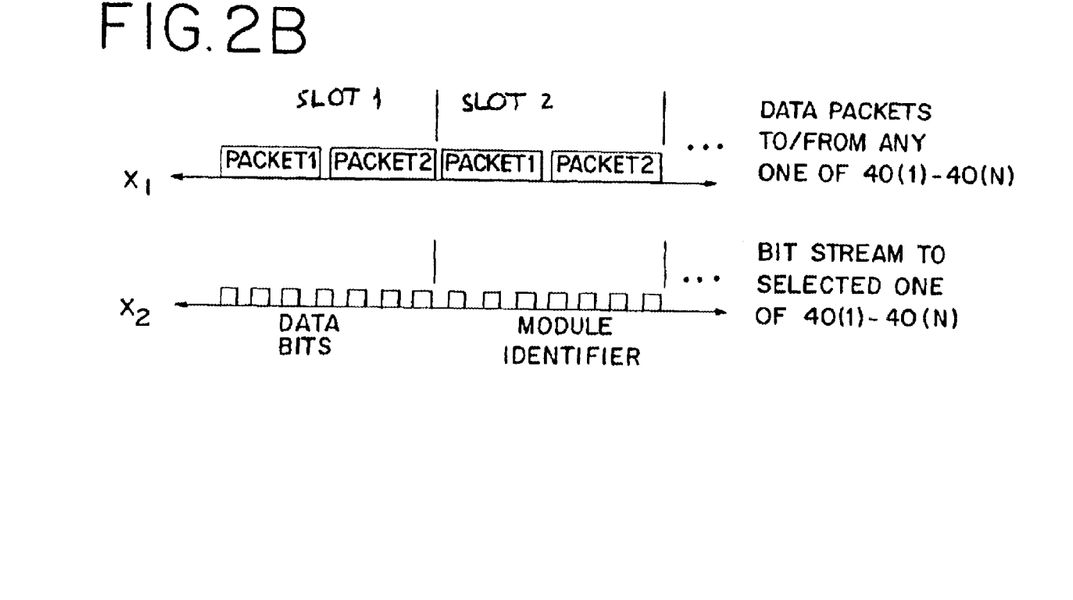
FIG. 2B shows signal diagrams for examples of digital signals that may be communicated using the distributed modem pool of FIG. 2A.

FIG. 2B shows examples of the signals X that may be communicated according to a packet based communication scheme and a bit string based communication string as described above. Signal X1 in FIG. 2B shows an example of packets communicated over the interconnection path 14 using a time division multiplexing scheme. The wide-band CODEC interface 92, 94 may include a scheme for allocating time slots to the destination modules. Time division multiplexing schemes are understood by those of ordinary skill in the art and therefore require no further discussion.

The signal X2 in FIG. 2B shows an example of a bit string being communicated to one of the second modules 40(1) et seq. The bit string includes a module identifier that may be used by the wide-band CODEC interface 94 to identify the destination module and the data bits that are being communicated.

Referring back to FIG. 2A, the concentrator 80 advantageously reduces the bandwidth at which the interconnection path 14 is required to communicate. Without using the concentrator 80, the bandwidth for the interconnection path 14 may need to be sized for approximately 3×S×M bits per second—where, M is the number of front modules 40(1) et seq.; S is the data rate specified for one of the subscriber lines 12; and 3 is the approximate over-sampling multiplier used by the signal converter 30. The bandwidth is necessary because without the concentrator 80, each of the first modules 20(1) et seq. would operate its signal converter 30 at full speed. Each of the first modules 20(1) et seq. would also exchange digital signals with one of the second modules 40(1) et seq. at all times. This would include times during which the user is idle, or the user is transmitting data at an effective rate much lower than the maximum supported rate.

Using the concentrator 80, the required bandwidth becomes much less. For example, if a 20:1 concentration ratio may be achieved by the concentrator 80 in a first module 20(1) et seq. that oversamples by 3× the data rate, the traffic from each user connected to the subscriber lines 12 becomes 0.15 times S bits per second. The aggregate traffic on the concentrated interconnection path 14 then becomes 0.15×M×S bits per second. The signal processor 50 in the second modules 40(1) et seq., as a result of normal modulation/demodulation functions, reduces the oversampling rate of 0.15×S per user to a concentrated rate of 0.05×S bits per second per user. This rate represents actual user data.

The concentration ratios of the concentrator 80 may depend on many factors including the nature of the user traffic. The number N of the second modules 40(1) et seq. may depend on a number of things including the concentration ratio and the processing power of the DSP and/or general processor in each second module 40(l) et seq.

The number N of second modules 40(1) et seq. in the second chassis 120 may be the same or less than the number M of first modules 20(1) et seq. in the first chassis 100. The advantage of having N <M is that using fewer second modules 40(1) et seq. lowers the total cost of the distributed modem pool 60.

Figure 3:
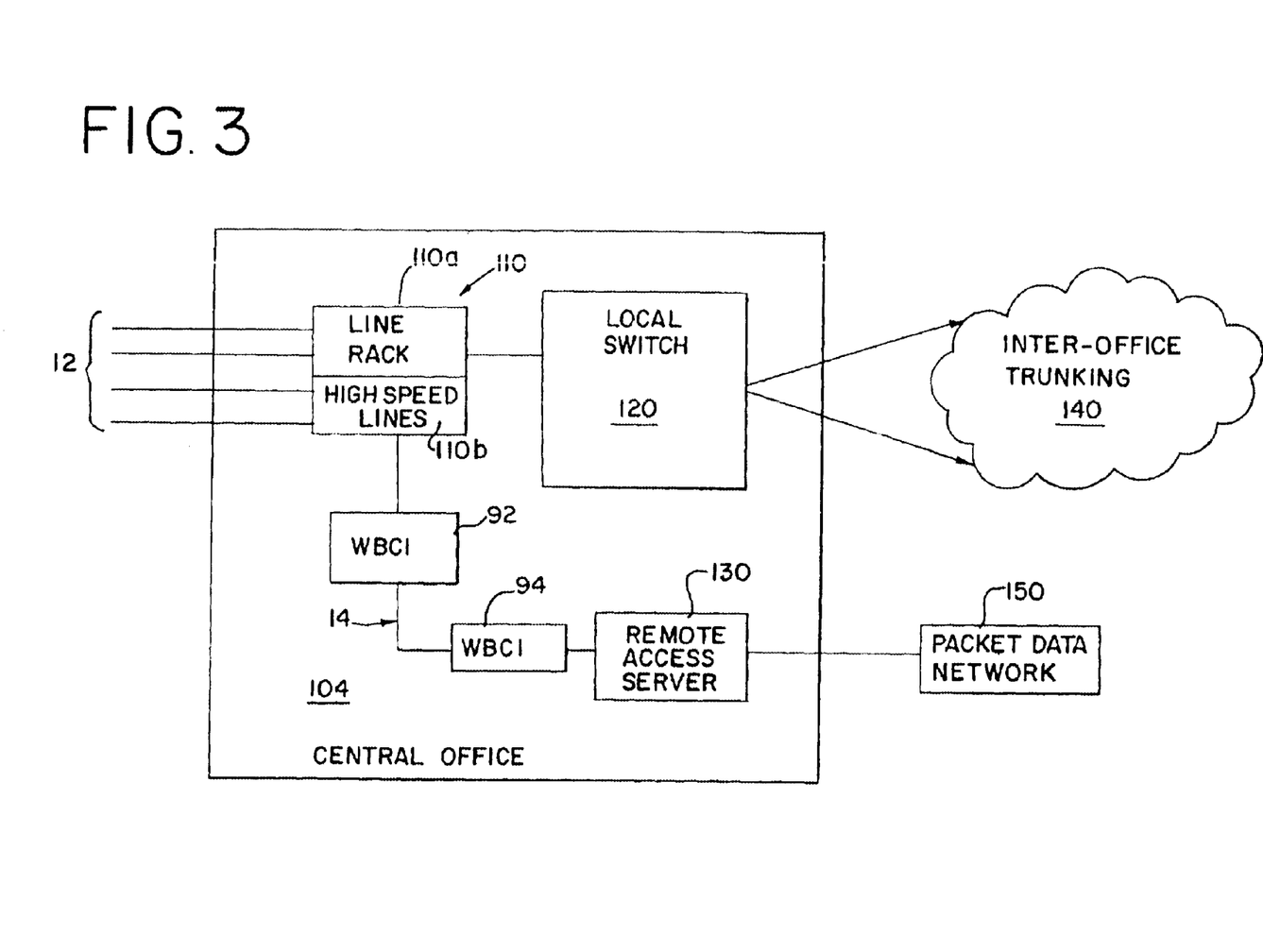
FIG. 3 is an example of a second system that uses the distributed modem of FIG. 1.

The distributed modem 10 shown in FIG. 1 may be used to provide high-speed data access without requiring the insertion of additional telephony or data communications equipment. FIG. 3 is a block diagram of a system that uses a distributed modem pool such as the distributed modem pool 60 in FIG. 2 to provide high-speed data access to users connected directly to a central office switch. Referring to FIG. 3, a central office 104 includes a local switch 120, a line rack 110, a remote access server 130 and an interconnection path 14.

The local switch 120 provides telecommunications switching functions for users connected on subscriber's lines 12. The local switch 120 completes connections for the users over an interoffice trunking system 140, or for calls within the service area of the central office 104, over a designated subscriber line 12.

The line rack 110 may include M first modules 20 (shown in FIG. 2A) mounted in the form of line cards similar to the line cards that provide termination points for subscriber lines 12. The first modules 20 may terminate high-speed lines at 110b. The line cards for the high-speed lines 110b may include a connection to the interconnection path 14 via the first and second wide-band CODEC interfaces 92, 94.

The interconnection path 14 may be connected to N second modules 40(1) et seq. (shown in FIG. 2A) which may be mounted in a remote access server 130. The remote access server 130 provides a network interface to a packet data network 150. Using the system shown in FIG. 3, a user may initiate a connection at a high-speed line 110b to access data services on the packet data network 150 via the remote access server 130.

The remote access server 130 may be implemented using any network access server with an interface that includes modems. For example, the remote access server 130 may include systems such as those disclosed in U.S. Pat. No. 5,528,595 to Walsh et al., the contents of which are incorporated herein by reference. The advantage of using the system shown in FIG. 3 is that users that connect directly to the central office may have a dedicated high-speed line at 110b that will provide them with access to the packet data network 150 without having to install special equipment at the user premises without inserting special equipment into the telephone network. Moreover, the system in FIG. 3 does not require any services from the local switch 120, thereby efficiently providing data traffic offloading.

Figure 4:
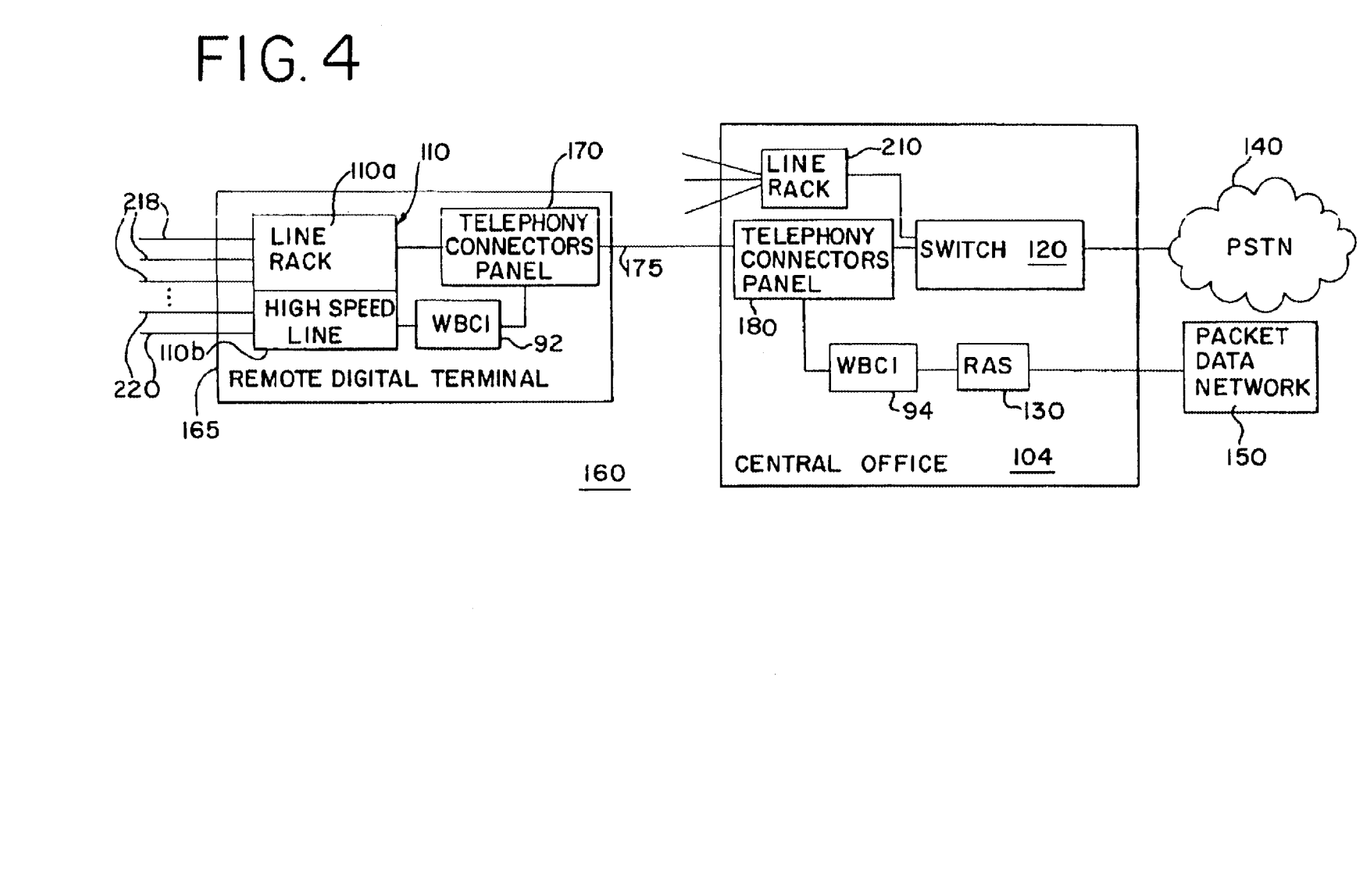
FIG. 4 is an example of a third system that uses the distributed modem of FIG. 1.

The distributed modem pool of FIG. 2a may be further extended to include a non-collocated modem pool 160 as shown in FIG. 4. The non-collocated distributed modem pool 160 may include a remote digital terminal 165 connected by a digital signal line 175 to the central office 104. The remote digital terminal 165 may include a line rack 110 having subscriber line cards 110a for the termination of basic service subscriber lines 218 and one or more high-speed line cards 110b.

The high-speed line cards 110b may be used to terminate the high-speed data access lines 220. The line rack 110 may include multiplexing equipment for connecting the subscriber lines 218 to a telephony connector panel 170, which connects via the digital signal line 175 to a central office 104. At the central office 104, the digital signal line 175 connects to a second telephony connector panel 180, which connects basic telephone calls to the switch 120.

The telephony connectors panels 170, 180 may include any telephony cross-connect, multiplexing and signal conditioning equipment. Preferably, the telephony connector panels 170, 180 provide high-speed connections over copper or fiber-optic cables. For example, the telephony connector panels 170, 180 may include any digital signal systems that communicate at DS3 or higher signal levels. The SONET optical communication system is most preferred because (as described with reference to FIG. 5) SONET equipment may be used with the appropriate interface to communicate over multiple channels. By using multiple channels, each of the first modules 20(1) et seq. may communicate using high-speed data access at rates that are higher than the 64 kbits/sec limitation.

The remote digital terminal 165 may also include a wide-band CODEC interface 92 for connecting the high-speed line cards 110b to the telephony connector panel 170. The interconnection path for connecting to second modules in the remote access server 130 includes the wide-band CODEC interface 92, the telephony connector panel 170, the digital signal line 175, the second telephony connector panel 180 and the second wide-band CODEC interface 94. The digital signal line 175 may include any known optical or copper cable digital telephone line. Preferably, the digital signal line 175 is a fiber cable using a SONET system.

One advantage of using the distributed modem pool 160 in FIG. 4 is that a user can connect its high-speed data line 220 to a line rack 110 without having to have a direct connection to the central office. The first modules 20 (shown in FIG. 2A) do not include the sensitive digital processing circuitry that may not tolerate the harsh environments found in the remote digital terminal 165. Nevertheless, by connecting the first module 20 to the high-speed digital signal line 175, the user is provided with a high-speed data access line without having to use special equipment at the user premises or at the central office 104.

The distributed modem pool 60 shown in FIG. 2A may be further extended to support the acceptance of data calls from either front modules 20 (shown in FIG. 2a) connected to the wide-band CODEC interface 92 or from existing post-switch adjunct systems, and routing them via a transport mechanism to the common remote access server center or centers described above. The same remote access server equipment, some of which may already exist at the central offices, may then be able to provide both digital processing from second modules connected to wide-band CODEC interfaces 94 and conventional full modem services to conventional data services users. In this manner, the digital signal processing resources available in the remote access server equipment may then be shared among both multiple users and two different classes of users.

Figure 5:
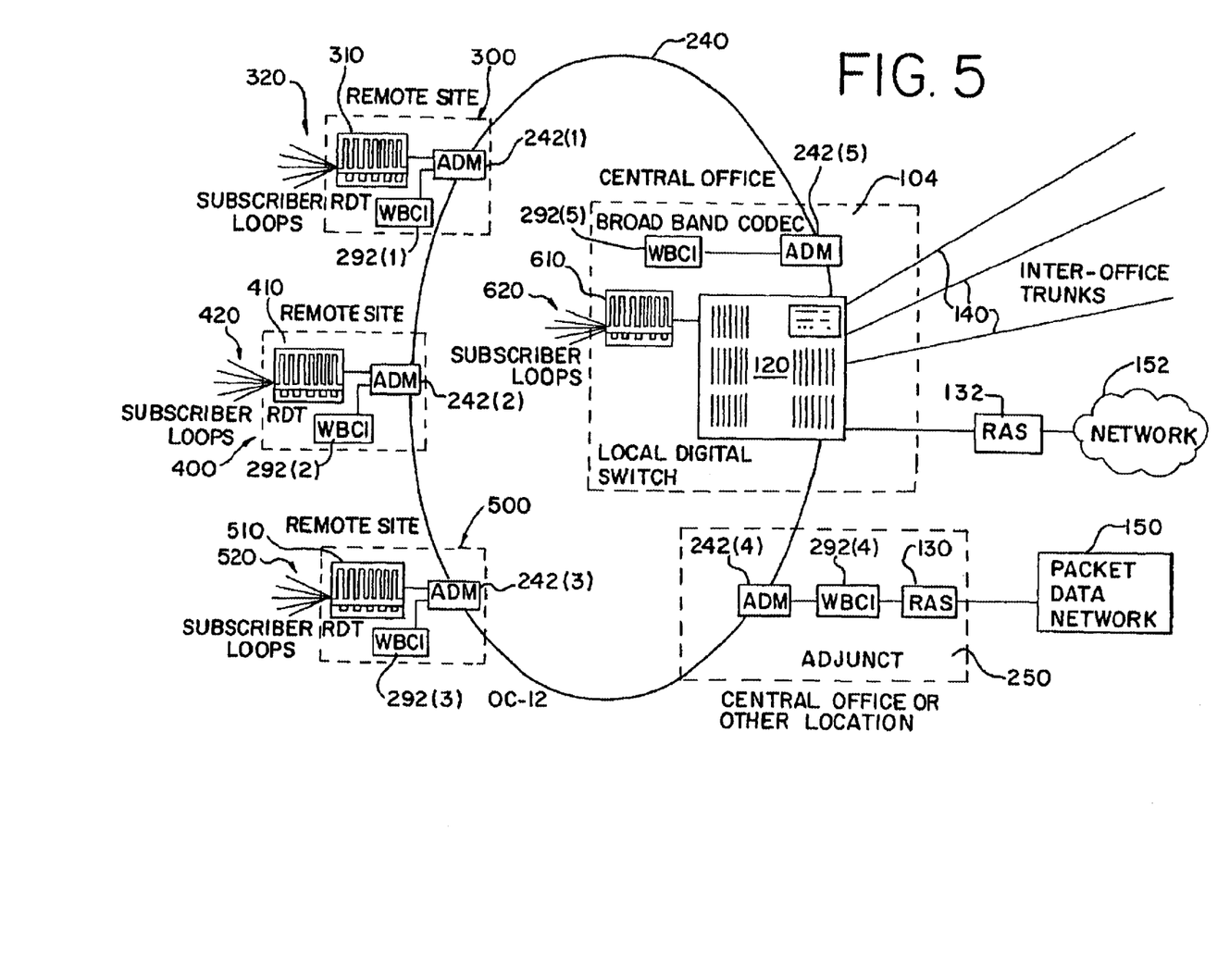
FIG. 5 is an example of a fourth system that uses the distributed modem of FIG. 1.

FIG. 5 shows a block diagram of a distributed modem pool that provides multiple class services. The system in FIG. 5 includes central office 104 having a local data switch 120 which is connected to a carrier serving area of about 2,000 lines using a SONET ring 240. The central office 104 serves a local access transport area (LATA) which may contain many carrier service areas each served by a remote digital terminal. The block diagram in FIG. 5 shows a first remote digital terminal 300, a second remote digital terminal 400 and a third remote digital terminal 500.

Each remote digital terminal 300, 400 and 500 may contain a plurality of subscriber line cards mounted in a first line rack 310, a second line rack 410 and a third line rack 510, respectively. The subscriber line cards in the line racks 310, 410, 510 may include first modules 20 (shown in FIG. 2A) for providing high-speed data access lines at the subscriber loops 320, 420, 520, respectively.

The remote digital terminals 300, 400, 500 may also communicate with the high capacity SONET ring 240 via an add-drop multiplexer 242(1)–242(3). An add-drop multiplexer is a device which can either insert or drop DS1, DS2 and DS3 channels or SONET signals in to/from a SONET bit string. The add-drop multiplexer extracts the DS level signal without going through the rigorous process of demultiplexing and remultiplexing which is required in traditional T/E-carrier systems. The SONET ring 240 may also be chained to other rings having additional remote digital terminal depending on the population density and traffic characteristics.

The SONET ring 240 is typically an optical fiber OC-3 (155.52 megabits per second) or OC-12 (622.08 megabits per second) and conveys GR-303 signaling information between the remote digital terminals 300, 400, 500 and the central office local switch 120. The add-drop multiplexers 242(1) et seq. on a relatively fixed basis, switch specific ring time slots to/from a lower speed drop to the remote digital terminal 300, 400, 500. For example, a drop may include one or more DS-3s (672 slots each) or one or more DS-1s (24 slots each).

The remote access server 130 may be included in an adjunct 250 and connected to the SONET ring 240 via an add-drop multiplexer 242(4) and a second wide-band CODEC interface 292(4). The remote access server 130 may include second modules 40 as described in FIGS. 3 and 4. The second modules 40 may be connected to the SONET ring 240 via the wide-band CODEC interface 292(4) to provide digital processing and access to the packet data network 150. The first modules 20 may be connected to the second modules 40 in the remote access server 130 via the first wide-band CODEC interfaces 292(1), 292(2), 292(3), 292(5).

The local switch 120 in the central office 104 may communicate with the SONET ring 240 using the add-drop multiplexer 242(5). The line rack 610 in the central office 104 may include high-speed line cards connected to the subscriber routes 620. The high-speed line cards may communicate with the second modules in the remote access server 130 using the wide-band CODEC interface 292(5), the add-drop multiplexer 242(5) and the SONET ring 240.

The system in FIG. 5 provides two data access paths for subscribers who wish to connect to the packet data network 150. For subscribers connected to the local switch 120, either directly or via a remote digital terminal 300, 400, 500, who do not have a special wide-band line card, the local switch 120 routes the call to basic modem equipment (not shown) on the remote access server 132. Although this data access path may eliminate interoffice traffic, the services of the local switch 120 are still needed. If, however, the modem equipment is attached to the signaling system 7 network, and the local switch 120 permits such an operation, the modem equipment may terminate calls from other central offices via the interoffice trunks 140. Although interoffice traffic is not eliminated, the local switch 120 may be able to manage modem resources more efficiently.

In the second data path, the subscribers that are served by the local switch 120 either directly or via a remote digital terminal 300, 400, 500 may have data routed directly via the ring 240 to the modem equipment (not shown). The SONET ring 240 and associated ADMs 242(1) et seq. establish a direct connection between the subscriber line cards and the modem equipment. A subscriber that is served with a first module 20 (shown in FIG. 2a) line card through a wide-band CODEC interface 292(1) et seq., may be allotted multiple channels on the SONET ring 240 using the add-drop multiplexers 242(1) et seq. depending on the required speeds.

One advantage of the multiple class system shown in FIG. 5 is that high-speed data access may be provided without inserting equipment in the telephony infrastructure. High-speed subscriber line cards may simply be added to line racks along with wide-band codec interfaces and the digital signal processing cards with no impact on the operation of the telephone equipment.

Another advantage is that the system in FIG. 5 supports data access for users that have high-speed subscriber lines, users that do not have any special high-speed service and users that have pre- and post-switch adjunct based services.

The system in FIG. 5 also offers statistical advantages with respect to the data communicated between the first modules in the line racks 310, 410, 510, 610 and the second modules in the remote access server 130. These advantages reduce the need for a one-to-one correspondence between the first modules and the second modules. Fewer second modules may be used per user connection thereby lowering the overall cost of the system.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A communications system for communicating data between a data system and a user connected to a subscriber line comprising:

a first module communicatively connected to the subscriber line to receive a first analog signal and to send a second analog signal, the first module having:
a first digital connection for sending a first digital signal and receiving a second digital signal; and
a signal converter for converting the first analog signal to the first digital signal and for converting a second digital signal to the second analog signal;

a second module, physically separate from the first module and communicably connected to the data system, the second is module having:
a second digital connection for receiving the first digital signal and sending the second digital signal; and a signal processor for processing the first digital signal received from the second digital connection as a first data stream for sending to the data system and for processing a second data stream received from the date system as the second digital signal; and an interconnection path for connecting the first module to the second module, the interconnection path being a high-bandwidth connection, the interconnection path being operable to communicate the first digital signal and the second digital signal between the first digital connection and the second digital connection.

2. A system as claimed in claim 1 further comprising a third module wherein the third module comprises a concentrator operable to determine if the first digital signal includes user data.

3. A system as claimed in claim 2 wherein the subscriber line data detector is operable to send the first digital signal when the concentrator determines that the first digital signal includes user data.

4. A system as claimed in claim 2 wherein the subscriber line data detector is operable to determine if the first digital signal indicates an absence of user data in the first digital signal.

5. A system as claimed in claim 4 wherein the subscriber line data detector is operable to inhibit the sending of the first digital signal when the subscriber line data detector determines that the first digital signal indicates the absence of user data in the first analog signal.

6. A system as claimed in claim 1 wherein:

the first analog signal communicates user data at a data rate of S bits per second; and the signal converter in the first module includes a coder/decoder (CODEC) for sampling the first analog signal.

7. A system as claimed in claim 6 wherein the first module sends the first digital signal as packets of CODEC samples.

8. A system as claimed in claim 6 further comprising a third module wherein the third module comprises:

a concentrator operable to determine if the CODEC samples indicate a presence of user data in the first analog signal.

9. A system as claimed in claim 8 wherein the subscriber line data detector is operable to send the CODEC samples when the subscriber line data detector determines that the CODEC samples indicate the presence of user data in the first analog signal.

10. A system as claimed in claim 8 wherein the subscriber line data detector is operable to determine if the CODEC samples indicate an absence of user data in the first analog signal.

11. A system as claimed in claim 10 wherein the subscriber line data detector is operable to inhibit the sending of the CODEC samples when the subscriber line data detector determines that the CODEC samples indicates the absence of user data in the first analog signal.

12. A system as claimed in claim 1 wherein the second module includes a processing unit for modulating/demodulating the first digital signal.

13. A system as claimed in claim 12 wherein the processing unit includes a digital signal processor.

14. A system as claimed in claim 12 wherein the processing unit includes a general processor.

15. A system as claimed in claim 12 wherein the processing unit performs compression.

16. A system as claimed in claim 12 wherein the processing unit performs error detection and correction.

17. A system as claimed in claim 1 wherein the first module resides on a first circuit board and the second module resides on a second circuit board, the second board being physically separate from the first board.

18. A system as claimed in claim 1 wherein the first module resides a first chassis and the second module resides on a second chassis, the second chassis being physically separate from the first chassis.

19. A method for communicating data between a user at a subscriber line and a data network comprising the steps of:

in a first module, converting an analog signal at the subscriber line to a digital signal;

determining whether the digital signal includes user data;

if the signal includes user data, communicating the digital signal to a second module over a high bandwidth interconnection path between the first module and the second module, the second module being physically separate from the first module;

in the second module, demodulating the digital signal to a data signal; and communicating the data signal to a data network.

20. A method as claimed in claim 19 wherein the step of determining whether the digital signal includes user data comprises the step of determining if the subscriber line is carrying signals that demodulate to signals that convey information.

21. A method as claimed in claim 19 wherein the step of determining whether the digital signal includes user data comprises the step of determining if the subscriber line is carrying user data signals that demodulate to electrical data signals that convey information.

22. A communications system for communicating data between at least one data system and a plurality of users comprising:

M first modules, each first module communicably connected to a user via a subscriber line, each first module having:

a signal converter for converting a first analog signal received from the subscriber line to a first digital signal; and a first digital connection for sending the first digital signal;

N second modules, physically separate from the M first modules, N being less than or equal to M, the N second modules being communicably connected to the data system, each second module having:

a second digital connection for receiving the first digital signal; and a signal processor for processing the first digital signal received from the second digital connection as a first data stream for sending to the data system; and an interconnection path for connecting the M first modules to the N second modules, the interconnection path being a high-bandwidth connection, the interconnection path being operable to communicate the first digital signal between the first digital signal connection of the first modules and the second digital connection of the second modules.

23. A system as claimed in claim 22 further comprising the N second modules being operable to process a second data stream received from the data system as a second digital signal and being operable to send the second digital signal, the first M modules being operable to receive the second digital signal, convert the second digital signal to a second analog signal and being operable to send the second analog signal, the interconnection path being operable to communicate the second digital signal between the first digital connection and the second digital connection.

24. The system of claim 22 further comprising a third module wherein the third module comprises a concentrator operable to determine if the first digital signal includes user data.

25. The system of claim 24 wherein the third module communicates the first digital signal as a plurality of packets to any one of the N second modules.

26. The system of claim 24 further comprising:
a first wide-band codec interface connected to the M first modules, the first wide-band codec interface being operable to direct the first digital signal to one of the second modules; and
a second wide-band codec interface connected to the N second modules, the second wide-band codec interface being operable to direct the second digital signal to one of the first modules.

27. The system of claim 26 wherein the first wide-band codec interface communicates the first digital signal when the first digital signal includes user data and inhibits the first digital signal when the first digital signal includes an idle signal.

28. A system as claimed in claim 22 wherein each of the first modules sends the first digital signal as packets of CODEC samples.

29. A system as claimed in claim 28 further comprising a third module wherein the third module comprises:
a concentrator operable to determine if the CODEC samples indicate a presence of user data in the first analog signal.

30. A system as claimed in claim 29 wherein the subscriber line data detector is operable to send the CODEC samples when the subscriber line data detector determines that the CODEC samples indicate the presence of user data in the first analog signal.

31. A system as claimed in claim 29 wherein the subscriber line data detector is operable to determine if the CODEC samples indicate an absence of user data in the first analog signal.

32. A system as claimed in claim 31 wherein the subscriber line data detector is operable to inhibit the sending of the CODEC samples when the subscriber line data detector determines that the CODEC samples indicates the absence of user data in the first analog signal.

33. The system of claim 32 further comprising:
a first wide-band codec interface connected to the M first modules, the first wide-band codec interface being operable to direct the CODEC samples to one of the second modules; and
a second wide-band codec interface connected to the N second modules, the second wide-band codec interface being operable to direct the CODEC samples to one of the first modules.

34. The system of claim 33 wherein the first wide-band codec interface communicates the CODEC samples when the CODEC samples include user data and inhibits the first digital signal when the CODEC samples include an idle signal.

35. A method for communicating data between a plurality of users at a plurality of subscriber lines and at least one data network comprising the steps of:
in at least one of M first modules, converting an analog signal at the subscriber line to a digital signal;
determining whether the digital signal includes user data;
if the digital signal includes user data, communicating the digital signal to at least one of N second modules, communicating over a high-bandwidth connection, the second modules being physically separate from the first modules;
in one of the second modules, demodulating the digital signal to a data signal; and
communicating the data signal to one of the data networks.

36. A method as claimed in claim 35 wherein the step of determining whether the digital signal includes user data comprises the step of determining if the subscriber line is carrying signals that demodulate to signals that convey information.

37. A method as claimed in claim 35 wherein the step of determining whether the digital signal includes user data comprises the step of determining if the subscriber line is carrying user data signals that demodulate to electrical data signals that convey information.

38. A method as claimed in claim 37 wherein the step of communicating the digital signals to the at least one of the N second modules comprises the step of communicating the digital signals to a selected one of the N second modules.

39. A method as claimed in claim 37 wherein the step of communicating the digital signals to the at least one of the N second modules comprises the step of communicating the digital signals to any one of the N second modules.

40. A line card connected to a subscriber line comprising:
a network circuit for interfacing with the subscriber line;
a digital circuit for interfacing with a data system;
a signal converting circuit for converting a first analog signal received from the subscriber line to a first digital signal for sending to the digital circuit;
a subscriber line data detector operable to determine if the first digital signal includes user data, the subscriber line data detector being operable to inhibit sending the first digital signal when the subscriber line data detector detects an absence of user data; and
an interface to an interconnection path for connecting the subscriber line to the signal converting circuit, the interconnection path being operable to communicate at a data rate greater than 64 kbits/sec.

41. A line card as claimed in claim 40 further comprising the signal converting circuit converting a second digital signal received from the digital circuit to a second analog signal for sending over the subscriber line.

42. A line card as claimed in claim 40 wherein:
the first analog signal communicates user data at a data rate of S bits per second; and
the signal converter in the line card includes a coder/decoder (CODEC) for sampling the first analog signal.

43. line card as claimed in claim 42 wherein the digital circuit sends the first digital signal as packets of CODEC samples.

44. A line card as claimed in claim 42 further comprising a subscriber line data detector operable to determine if the CODEC samples indicate a presence of user data in the first analog signal.

45. A line card as claimed in claim 44 wherein the subscriber line data detector is operable to send the CODEC samples when the subscriber line data detector determines that the CODEC samples indicate the presence of user data in the first analog signal.

46. A line card as claimed in claim 44 wherein the subscriber line data detector is operable to determine if the CODEC samples indicate an absence of user data in the first analog signal.

47. A line card as claimed in claim 46 wherein the subscriber line data detector is operable to inhibit the sending of the CODEC samples when the subscriber line data detector determines that the CODEC samples indicates the absence of user data in the first analog signal.

48. A communications system for communicating data between a data system and a user connected to a subscriber line comprising:
- a first module on a first circuit board communicably connected to the subscriber line to receive a first analog signal, the first module having:
  - a first digital connection for sending a first digital signal,
  - a signal converter for converting the first analog signal to the first digital signal; and
- a second module on a second circuit board, the second circuit board being physically separate from the first circuit board, communicably connected to the data system, the second module having:
  - a second digital connection for receiving the first digital signal; and
  - a signal processor for processing the first digital signal received from the second digital connection as a first data stream for sending to the data system; and
  - an interconnection path for connecting the first module to the second module, the interconnection path being operable to communicate at a data rate greater than 64 kbits/sec, the interconnection path being operable to communicate the first digital signal between the first digital connection and the second digital connection.

49. A method for communicating data between a user at a subscriber line and a data network comprising the steps of:
- in a first module, converting an analog signal at the subscriber line to a digital signal
- determining whether the digital signal includes user data by determining if the subscriber line is carrying signals that demodulate to signals that convey information;
- if the digital signal includes user data, communicating the digital signal to a second module over an interconnection path at a rate greater than 64 kbits/sec between the first module and the second module, the second module being physically separate from the first module;
- in the second module, demodulating the digital signal to a data signal; and communicating the data signal to a data network.

50. A method for communicating data between a user at a subscriber line and a data network comprising the steps of:
- in a first module, converting an analog signal at the subscriber line to a digital signal;
- determining whether the digital signal includes user data by partially demodulating the digital signal;
- if the digital signal includes user data, communicating the digital signal to a second module over an interconnection path at a rate greater than 64 kbits/sec between the first module and the second module, the second module being physically separate from the first module;
- in the second module, demodulating the digital signal to a data signal; and
- communicating the data signal to a data network.

51. A communications system for communicating data between at least one data system and a plurality of users comprising:
- M first modules, each first module communicably connected to a user via a subscriber line, each first module having:
  - a signal converter for converting a first analog signal received from the subscriber line to a first digital signal and for converting a second digital signal to a second analog signal; and
  - a first digital connection for sending the first digital signal and receiving the second digital signal;
- N second modules, physically separate from the M first modules, N being less than or equal to M, the N second modules being communicably connected to the data system, each second module having:
  - a second digital connection for receiving the first digital signal and sending the second digital signal; and
  - a signal processor for processing the first digital signal received from the second digital connection as a first data stream for sending to the data system and for processing a second data stream received from the data system as the second digital signal; and
- an interconnection path for connecting the M first modules to the N second modules, the interconnection path being a wide band connection, the interconnection path being operable to communicate the first digital signal and the second digital signal between the first digital signal connection of the first modules and the second digital connection of the second modules.

52. The system of claim 51 further comprising a third module wherein the third module comprises a concentrator operable to determine if the first digital signal includes user data.

53. The system of claim 52 wherein the third module communicates the first digital signal as a plurality of packets to any one of the N second modules.

54. The system of claim 52 further comprising:
- a first wide-band codes interface connected to the M first modules, the first wide-band codec interface being operable to direct the first digital signal to one of the second modules; and
- a second wide-band codec interface connected to the N second modules, the second wide-band codec interface being operable to direct the second digital signal to one of the first modules.

55. The system of claim 54 wherein the first wide-band codec interface communicates the first digital signal when the first digital signal includes user data and inhibits the first digital signal when the first digital signal, includes an idle signal.

56. A system as claimed in claim 51 wherein each of the first modules sends the first digital signal as packets of CODEC samples.

57. A system as claimed in claim 56 further comprising a third module wherein the third module comprises:
- a concentrator operable to determine if the CODEC samples indicate a presence of user data in the first analog signal.

58. A system as claimed in claim 57 wherein the concentrator is operable to send the CODEC samples when the concentrator determines that the CODEC samples indicate the presence of user data in the first analog signal.

59. A system as claimed in claim 57 wherein the concentrator is operable to determine if the CODEC samples indicate an absence of user data in the first analog signal.

60. A system as claimed in claim 59 wherein the concentrator is operable to inhibit the sending of the CODEC samples when the concentrator determines that the CODEC samples indicates the absence of user data in the first analog signal.

61. The system of claim 60 further comprising:
- a first wide-band codec interface connected to the M first modules, the first wide-band codec interface being operable to direct the CODEC samples to one of the second modules; and a second wide-band codec interface connected to the N second modules, the second wide-band codec interface being operable to direct the CODEC samples to one of the first modules.

62. The system of claim 61 wherein the first wide-band codec interface communicates the CODEC samples when the CODEC samples include user data and inhibits the first digital signal when the CODEC samples include an idle signal.

63. A method for communicating data between a plurality of users at a plurality of subscriber lines and at least one data network comprising the steps of:

in at least one of M first modules, converting an analog signal at the subscriber line to a digital signal;

determining whether the digital signal includes user data by determining if the subscriber line is carrying signals that demodulate to signals that convey information;

if the digital signal includes user data, communicating the digital signal to at least one of N second modules over an interconnection path between the M first modules and the N second modules, communicating at a data rate greater than 64 kbits/sec, the second modules being physically separate from the first modules;

in one of the and modules, demodulating the digital signal to a data signal; and communicating the data signal to one of the data networks.

64. A method for communicating data between a plurality of users at a plurality of subscriber lines and at least one data network comprising the steps of:

in at least one of M first modules, converting an analog signal at the subscriber line to a digital signal;

determining whether the digital signal includes user data by partially, demodulating the digital signal;

if the digital signal includes user data, communicating the digital signal to at least one of N second modules over an interconnection path between the M first modules and the N second modules, communicating at a data rate greater than 64 kbits/sec, the second modules being physically separate from the first modules;

in one of the second modules, demodulating the digital signal to e data signal; and communicating the data signal to one of the data networks.

65. A method as claimed in claim 64 wherein the step of communicating the digital signals to the at least one of the N second modules comprises the step of communicating the digital signals to a selected one of the N second modules.

66. A method as claimed in claim 64 wherein the step of communicating the digital signals to the at least one of the N second modules comprises the step of communicating the digital signals to any one of the N second modules.

\* \* \* \* \*